United States Patent [19]

Kobayashi et al.

[11] 3,775,758

[45] Nov. 27, 1973

[54] MAGNETIC THIN FILM PLATED WIRE MEMORY

[75] Inventors: Seihin Kobayashi; Michihiro Torii; Takehiko Jojima; Masanao Okuda, all of Shizuoka, Japan

[73] Assignee: Fuji Electrochemical Co., Ltd., Tokyo, Japan

[22] Filed: Oct. 20, 1971

[21] Appl. No.: 190,891

[30] Foreign Application Priority Data

Oct. 28, 1970 Japan ............................ 45/107157

[52] U.S. Cl.340/174 VA, 340/174 BC, 340/174 GP, 340/174 M, 340/174 TF, 340/174 PW, 340/174 WC, 340/174 S

[51] Int. Cl. ........................ G11c 11/04, G11c 11/14

[58] Field of Search ............... 340/174 BC, 174 PW, 340/174 VA, 174 GP, 174 JA

[56] References Cited

UNITED STATES PATENTS

| | | | |
|---|---|---|---|
| 3,623,037 | 11/1971 | Parks | 340/174 |
| 3,665,428 | 5/1972 | Olyphant, Jr. | 340/174 BC |
| 3,623,035 | 11/1971 | Kobayashi et al. | 340/174 BC |
| 3,432,822 | 3/1969 | Bertelsen | 340/174 VA |
| 3,728,698 | 4/1973 | Kobayashi et al. | 340/174 PW |

*Primary Examiner*—James W. Moffitt
*Attorney*—Fleit, Gipple & Jacobson

[57] ABSTRACT

A magnetic thin film plated wire memory is provided which comprises a first magnetic keeper covered with a second magnetic keeper, both keepers having high magnetic permeability. The first magnetic keeper is provided in its upper surface with a number of deep and shallow grooves intersecting at right angles with each other, said deep and shallow grooves each containing therein a driving wire and a magnetic wire, respectively. The second magnetic keeper has a number of parallel grooves on its lower surface in the same direction as and directly above the deep grooves in the first magnetic keeper, said parallel grooves containing therein conductive wires which are electrically connected at one end thereof to the conductive wires in the deep grooves in the first magnetic keeper.

3 Claims, 5 Drawing Figures

PATENTED NOV 27 1973 3,775,758

MAGNETIC THIN FILM PLATED WIRE MEMORY

Figures 1, 3:
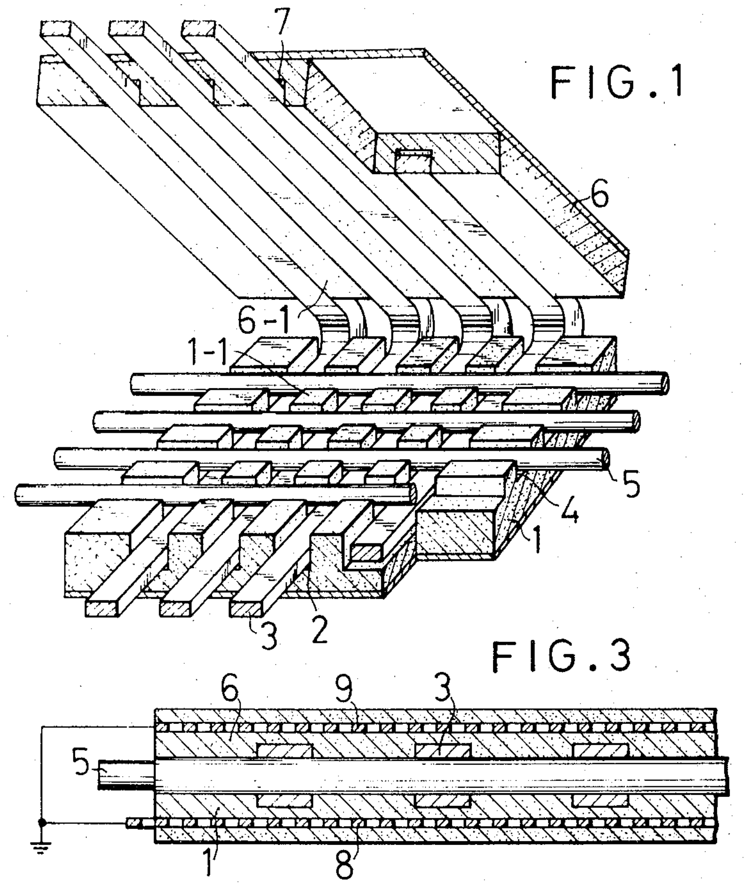

This invention relates to a magnetic thin film plated wire memory having a number of magnetic wires and driving wires intersected at right angles upon a magnetic keeper having high magnetic permeability, each of said magnetic wires having a thin film plated upon a conductive wire to have an easy axis of magnetization in the circumferential or axial direction of the conductive wire.

In a known magnetic thin film plated wire memory, a magnetic keeper is provided with a number of deep and shallow grooves intersecting at right angles with each other. Disposed within the deep and shallow grooves in the magnetic keeper are driving wires and magnetic wires, respectively. The driving wires and magnetic wires are electrically insulated from each other.

In such a magnetic thin film wire memory having the grooved magnetic keeper, the driving efficiency of the driving wires has been improved with the result that a packing density of the driving wires and the magnetic wires can be higher.

However, since external magnetic field affects upon the driving wires even at places other than the intersections of the driving wires with the magnetic wires, when the spaces between the wires, especially driving wires, are to be narrower, the magnetic fields around the adjacent intersections interact with each other to disturb the state of magnetization thereof. Such interaction reduces the reliability of memory and, thereby, the packing density of memory elements has been limited.

Furthermore, in the conventional magnetic thin film wire memory, a rigid conductive metal plate serving as an earth plate has been attached to the bottom surface of a magnetic keeper thereof. However, disadvantages have been experienced in that the metal plate imparts the rigidity to the memory itself with less elasticity, which is rather inconvenient to assemble the memory, and may come off while in assembly of the memory.

Accordingly, an object of the present invention is to provide a magnetic thin film plated wire memory in which packing density of memory elements can be higher with less interactions between adjacent memory elements.

Another object of the present invention is to provide a magnetic thin film plated wire memory as defined above, wherein the memory is reinforced with desired elasticity.

According to the present invention, a magnetic thin film plated wire memory comprises a first magnetic keeper of high magnetic permeability having a number of deep grooves and shallow grooves in its upper surface, each of said deep and shallow grooves being intersected at right angles with each other, a number of driving wires each disposed within said deep groove, a number of magnetic wires each disposed within said shallow groove, said magnetic wire being a conductive wire plated with a magnetic thin film thereon, a second magnetic keeper of high magnetic permeability having a number of parallel grooves on its lower surface in the same direction as and directly above said deep grooves in said first magnetic keeper, and a number of driving wires disposed within said grooves in said second magnetic keeper and electrically connected at one end thereof to said driving wires in said deep grooves in said first magnetic keeper, said second magnetic keeper being laminated on said first magnetic keeper with the lower surface of the former contacting with the upper surface of the latter.

Figures 2, 4, 5:
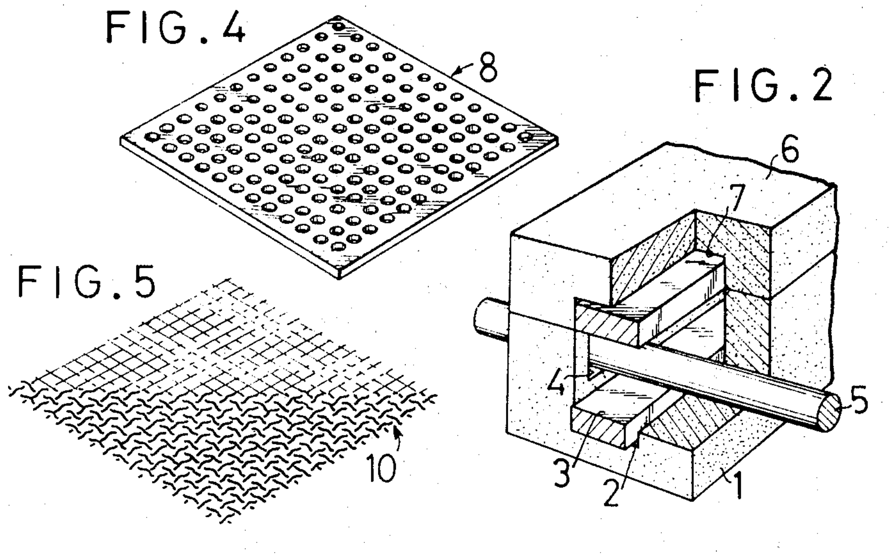

The aforementioned and other objects and features of the invention will be apparent from the following detailed description of specific embodiments thereof, when read in conjunction with the accompanying drawings, in which:

FIG. 1 is a perspective view showing a magnetic thin film plated wire memory, prior to its assembly, according to the present invention, FIG. 2 is a partially exposed perspective view showing the state that a magnetic keeper entirely encloses a magnetic wire at places not intersected by a driving wire, FIG. 3 is a sectional view partially showing an assembled magnetic thin film plated wire memory according to another embodiment of the present invention in which perforated plates are embedded in upper and lower magnetic keepers, FIG. 4 is a perspective view of the perforated conductive metal plate shown in FIG. 3, and FIG. 5 is a perspective view of a conductive metal mesh to be embedded in the magnetic keepers in place of the perforated conductive metal plates.

Referring to a first embodiment shown in FIGS. 1 and 2, a magnetic thin film plated wire memory comprises an upper magnetic keeper 6 and a lower magnetic keeper 1, both having high magnetic permeability. The lower magnetic keeper 1 is provided with a number of deep grooves 2 and shallow grooves 4 in its upper surface, both grooves 2 and 4 intersecting at right angles with each other. Each of the deep grooves contains a flat driving wire 3 therein with such a depth that the upper surface of the flat driving wire 3 is substantially on the same level as or somewhat below the bottom surface of the shallow grooves 4. Each of the shallow grooves 4 contains a magnetic wire 5 which is formed by plating a magnetic thin film on a conductive wire so as to have an easy axis of magnetization at the circumferential direction thereof. The upper magnetic keeper 6 has a number of parallel grooves 7 in the same direction as and directly above the deep grooves 2 in the lower magnetic keeper 1. The flat driving wires 3 in the deep grooves 2 in the lower magnetic keeper are bent at their one end and also disposed within the grooves 7 in the upper magnetic keeper 6. The upper magnetic keeper 6 thus prepared is laminated upon the lower magnetic keeper 1, so that, as shown in FIG. 1, a bottom plane 6–1 of the upper magnetic keeper 6 comes to contact with the upper plane 1—1 of the lower magnetic keeper 1.

In the magnetic thin film plated wire memory constructed as above, a driving current can be reduced to half as the driving wires in the upper magnetic keeper 6 act as return driving wire. In addition, since the magnetic wires 5 are entirely surrounded by the upper and lower magnetic keepers, which have high magnetic permeability, at places not intersected by driving wires 3 as shown in FIG. 2, they are completely free from the affection of the external magnetic field at these places. Consequently, only the intersections of the magnetic wires 5 with the driving wires 3 are magnetized enough, thereby defining the scope of magnetization precisely and reducing the interactions of magnetic field between the adjacent intersections.

In accordance with the present invention, when a magnetic thin film plated wire memory is produced which comprises plated magnetic wires of 0.1mm diameter, ribbon shaped conductive wires, and upper and lower magnetic keepers made of unfired flexible sheet of nickel-zinc type ferrite, the spaces between the adjacent conductive wires, i.e., driving wires, can be reduced to 0.4mm in practice which is far narrower than those of 1.2mm in the conventional one, thus improving the packing density of memory elements.

In a second embodiment shown in FIGS. 3 and 4, perforated conductive metal plates 8 and 9 are embedded into the lower and upper magnetic keepers 1 and 6, respectively. Each of the perforated plates 8 and 9 is made of a conductive plate of 0.06mm thickness in which holes of about 0.1mm diameter are made by etching technique with sapces of 0.3mm from each other, as shown in FIG. 4. In place of the perforated plates 8 and 9, conductive metal meshes 10 formed by knitting of extremely thin wires may be employed.

Though the perforated plates 8 and 9 are completely embedded into the magnetic keepers 1 and 6 in the embodiment shown in FIG. 3, they may be partially embedded into the magnetic keepers with their one side exposing to the outside thereof.

In the magnetic thin film plated wire memory according to the second embodiment, an additional advantage can be obtained in that the conductive perforate plates 8 and 9 or meshes 10 serving as ground plates do not come off from the magnetic keepers 1 and 6 while in assembly and after completion thereof and elastically reinforce the magnetic keepers.

Though the present invention has been described with reference to the preferred embodiments thereof, many modifications and alternations may be made within the spirit of the present invention, for example, the conductive wires in the upper magnetic keeper may be separate wires from those in the lower magnetic keeper, provided that the both conductive wires in the upper and lower magnetic keepers are electrically connected with each other.

What is claimed is:

1. A magnetic thin film plated wire memory comprising a first magnetic keeper of high magnetic permeability having a number of deep grooves and shallow grooves in its upper surface, each of said deep and shallow grooves being intersected at right angles with each other, a driving wire disposed within each of said deep grooves, a magnetic wire disposed within each of said shallow grooves, each of said magnetic wires having a magnetic thin film plated on a conductive wire, a second magnetic keeper of high magnetic permeability having a number of parallel grooves on its lower surface running in the same direction as and directly above said deep grooves in said first magnetic keeper, a driving wire disposed within each of said grooves in said second magnetic keeper and electrically connected at one end thereof to said driving wires in said deep grooves in said first magnetic keeper, the lower surface of said second magnetic keeper contacting the upper surface of said first magnetic keeper, the upper surface of said driving wires in said first magnetic keeper being substantially on the same level as the bottom surface of said shallow grooves and a conductive member having a plurality of openings therein embedded in each of said first and second magnetic keepers.

2. A magnetic thin film plated wire memory as claimed in claim 1, wherein said conductive members are perforated plates.

3. A magnetic thin film plated wire memory as claimed in claim 1, wherein said conductive members are wire meshes.

* * * * *